(12) United States Patent
Liu (10) Patent No.: US 11,971,621 B2
(45) Date of Patent: Apr. 30, 2024

(54) DISPLAY PANEL AND ELECTRONIC DEVICE

(71) Applicant: Wuhan China Star Optoelectronics Technology Co., Ltd., Hubei (CN)

(72) Inventor: Fancheng Liu, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 944 days.

(21) Appl. No.: 16/966,018

(22) PCT Filed: Apr. 2, 2020

(86) PCT No.: PCT/CN2020/083011
§ 371 (c)(1),
(2) Date: Jul. 30, 2020

(87) PCT Pub. No.: WO2021/164108
PCT Pub. Date: Aug. 26, 2021

(65) Prior Publication Data
US 2023/0168532 A1 Jun. 1, 2023

(30) Foreign Application Priority Data
Feb. 19, 2020 (CN) .......................... 202010101743.3

(51) Int. Cl.
*G02F 1/1333* (2006.01)
*G02F 1/133* (2006.01)
(Continued)

(52) U.S. Cl.
CPC ...... *G02F 1/13338* (2013.01); *G02F 1/13312* (2021.01); *G02F 1/133512* (2013.01);
(Continued)

(58) Field of Classification Search
CPC ........... G02F 1/13338; G02F 1/133512; G02F 1/13312; G06V 40/13; G06V 40/1318
See application file for complete search history.

(56) References Cited

U.S. PATENT DOCUMENTS 9,424,456 B1 8/2016 Kamath Koteshwara et al.
2010/0220269 A1* 9/2010 Takama ................ G06F 3/0421
430/321
(Continued)

FOREIGN PATENT DOCUMENTS

CN 202472183 10/2012
CN 105301819 2/2016
(Continued)

OTHER PUBLICATIONS

International Search Report and the Written Opinion dated Nov. 25, 2020 From the International Searching Authority Re. Application No. PCT/CN2020/083011 and Its Translation Into English. (17 Pages).
(Continued)

*Primary Examiner* — Jessica M Merlin (57) ABSTRACT

The present invention provides a display panel and an electronic device. The display panel includes a backlight module, an array substrate, a liquid crystal layer, a color filter plate, a touch substrate, and a fingerprint recognition unit. The array substrate is disposed on a light-exiting side of the backlight module. The liquid crystal layer is disposed on a side of the array substrate away from the backlight module. The color filter plate is disposed on a side of the liquid crystal layer away from the array substrate. The touch substrate is disposed on a side of the color filter plate away from the liquid crystal layer. The fingerprint recognition unit is disposed on a side of the color filter plate away from the
(Continued)

touch substrate. The display panel of the claimed invention can improve accuracy of fingerprint recognition.

17 Claims, 4 Drawing Sheets

(51) Int. Cl.
    *G02F 1/1335* (2006.01)
    *G02F 1/1345* (2006.01)
    *G06V 40/13* (2022.01)
(52) U.S. Cl.
    CPC .... *G02F 1/133514* (2013.01); *G02F 1/13452* (2013.01); *G06V 40/1318* (2022.01)

(56) References Cited

U.S. PATENT DOCUMENTS

| | | | |
|---|---|---|---|
| 2019/0019850 A1* | 1/2019 | Xu | G06V 40/12 |
| 2019/0272407 A1 | 9/2019 | Park et al. | |

FOREIGN PATENT DOCUMENTS

| | | |
|---|---|---|
| CN | 106897699 | 6/2017 |
| CN | 107480639 | 12/2017 |
| CN | 107833560 | 3/2018 |
| CN | 108496180 | 9/2018 |
| CN | 110068947 | 7/2019 |
| CN | 110161739 | 8/2019 |
| CN | 110262102 | 9/2019 |
| CN | 110796055 | 2/2020 |
| JP | 2009-069806 | 4/2009 |
| KR | 10-2015-0029129 | 3/2015 |
| KR | 10-2017-0031613 | 3/2017 |
| KR | 10-2018-0117903 | 10/2018 |

OTHER PUBLICATIONS

Notification of Office Action and Search Report dated Feb. 15, 2023 From the State Intellectual Property Office of the People's Republic of China Re. Application No. 202010101743.3 and Its Translation Into English. (17 Pages).

* cited by examiner

DISPLAY PANEL AND ELECTRONIC DEVICE

RELATED APPLICATIONS

This application is a National Phase of PCT Patent Application No. PCT/CN2020/083011 having International filing date of Apr. 2, 2020, which claims the benefit of priority of Chinese Patent Application No. 202010101743.3 filed on Feb. 19, 2020. The contents of the above applications are all incorporated by reference as if fully set forth herein in their entirety.

FIELD AND BACKGROUND OF THE INVENTION

The present invention relates to the field of fingerprint recognition, and in particular, to a display panel and an electronic device.

Fingerprints are inherent to everyone and are unique. With development of technology, a variety of electronic devices with fingerprint recognition functions have appeared on the market, such as mobile phones, tablet computers, and smart wearable devices, etc. In this way, users only need to touch fingerprint recognition modules of the electronic devices with a finger before operating the electronic devices with the fingerprint recognition functions, and the authority verification can be performed, which simplifies authority verification processes.

In fingerprint recognition processes, fingerprint recognition units perform fingerprint recognition based on light reflected by fingers to the fingerprint recognition units. However, there are shortcomings such as large signal noise, resulting in low accuracy of the fingerprint recognition.

SUMMARY OF THE INVENTION

The present invention provides a display panel and an electronic device to solve a problem of low fingerprint recognition rate of the display panel.

In order to solve the above technical problems, a technical solution adopted by the present invention is to provide a display panel. The display panel comprises a backlight module, an array substrate, a liquid crystal layer, a color filter plate, a touch substrate, and a fingerprint recognition unit. The array substrate is disposed on a light-exiting side of the backlight module. The liquid crystal layer is disposed on a side of the array substrate away from the backlight module. The color filter plate is disposed on a side of the liquid crystal layer away from the array substrate. The touch substrate is disposed on a side of the color filter plate away from the liquid crystal layer. The fingerprint recognition unit is disposed on a side of the color filter plate away from the touch substrate. The fingerprint recognition unit comprises a photodiode and a plurality of shading bars. The photodiode is disposed on a side of the color filter plate away from the touch substrate, the plurality of shading bars are disposed on a side of a photosensitive surface of the photodiode, and an orthographic projection of the plurality of shading bars on the array substrate is within an orthographic projection of the photodiode on the array substrate. Wherein the backlight module is used to emit white light to irradiate a finger touching the touch substrate, and the plurality of shading bars is used to block light partially reflected from the finger to the photodiode.

In order to solve the above technical problems, another technical solution adopted by the present invention is to provide an electronic device. The electronic device comprises a housing and a display panel, and the display panel is disposed on the housing. The display panel comprises a backlight module, an array substrate, a liquid crystal layer, a color filter plate, a touch substrate, and a fingerprint recognition unit. The array substrate is disposed on a light-exiting side of the backlight module. The liquid crystal layer is disposed on a side of the array substrate away from the backlight module. The color filter plate is disposed on a side of the liquid crystal layer away from the array substrate. The touch substrate is disposed on a side of the color filter plate away from the liquid crystal layer. The fingerprint recognition unit is disposed on a side of the color filter plate away from the touch substrate. The fingerprint recognition unit comprises a photodiode and a plurality of shading bars, the photodiode is disposed on a side of the color filter plate away from the touch substrate, the plurality of shading bars are disposed on a side of a photosensitive surface of the photodiode, and an orthographic projection of the plurality of shading bars on the array substrate is within an orthographic projection of the photodiode on the array substrate. Wherein the backlight module is used to emit white light to irradiate a finger touching the touch substrate, and the plurality of shading bars is used to block light partially reflected from the finger to the photodiode.

Beneficial effects of the present invention are: Light emitted by a backlight module is received pure color light after passing through a color filter plate to be irradiated on a finger touching a touch substrate. The pure color light can be red light, green light or blue light. The following uses the blue light as an example to explain. The blue light irradiates the finger and is reflected by the finger, and the blue light reflected by the finger passes through the color filter plate. Red and green layers in the color filter plate filter the reflected blue light, thereby filtering out noise light with small angle. A blue layer in the color filter plate will allow the reflected blue light to irradiate on a photosensitive surface of a photodiode. When the reflected blue light irradiates the photodiode, noise light with large angle is blocked by a shading bar. Therefore, the color filter plate and the shading bar cooperate with each other to shield both the noise light with small angle and the noise light with large angle, avoiding crosstalk phenomenon of adjacent fingerprint recognition units, and improving accuracy of fingerprint recognition. In addition, the number of shading bars is multiple, each shading bar only needs to cover a small part of a region, thereby reducing a height of the shading bar to reduce an overall thickness of a display panel.

BRIEF DESCRIPTION OF THE SEVERAL VIEWS OF THE DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DESCRIPTION OF SPECIFIC EMBODIMENTS OF THE INVENTION

The technical solutions in the embodiments of the present application will be clearly and completely described below, and it is obvious that the described embodiments are only a part of the embodiments of the present application, and not all of the embodiments. All other embodiments obtained by a person of ordinary skill in the art without any inventive work based on the embodiments in the present application are within the scope of protection of the present application.

Reference herein to "an embodiment" means that a specific feature, structure, or characteristic described in connection with the embodiment can be included in at least one embodiment of the application. The appearances of the phrase in various places in the specification are not necessarily all referring to the same embodiment, nor are separate or alternative embodiments mutually exclusive of other embodiments. It is explicitly and implicitly understood by one skilled in the art that the embodiments described herein can be combined with other embodiments.

Fingerprint patterns on each person's finger are different in patterns, breakpoints, and intersections, which show uniqueness and unchanged for life. According to this, we can correspond a person to his fingerprint, and compare his fingerprint with pre-stored fingerprint data to verify his true identity. This is called fingerprint recognition technologies. Thanks to electronic integrated manufacturing technology and fast and reliable algorithm research, optical fingerprint recognition technologies in the fingerprint recognition technologies have begun to enter our daily life and become the most in-depth research, most widely used and most developed technology in bioassay.

A working principle of the optical fingerprint recognition technologies is: Light emitted from a light source in a display panel 100 is irradiated on fingers and reflected by the fingers to form reflected light. The formed reflected light (i.e., signal light of fingerprint) is transmitted to a fingerprint recognition unit 60, and the fingerprint recognition unit 60 collects light signals incident thereon. Due to the specific texture on fingerprints, an intensity of the reflected light at each position of the fingers is different. Finally, optical signals collected by the fingerprint recognition units 60 are different, so that a true identity of the user can be determined. There is a plurality of fingerprint recognition units 60, and each fingerprint recognition unit 60 is responsible for fingerprint recognition of a part of a region. However, at present, there is a phenomenon of light crosstalk between the fingerprint recognition units 60, resulting in a low accuracy of fingerprint recognition.

Figure 1:
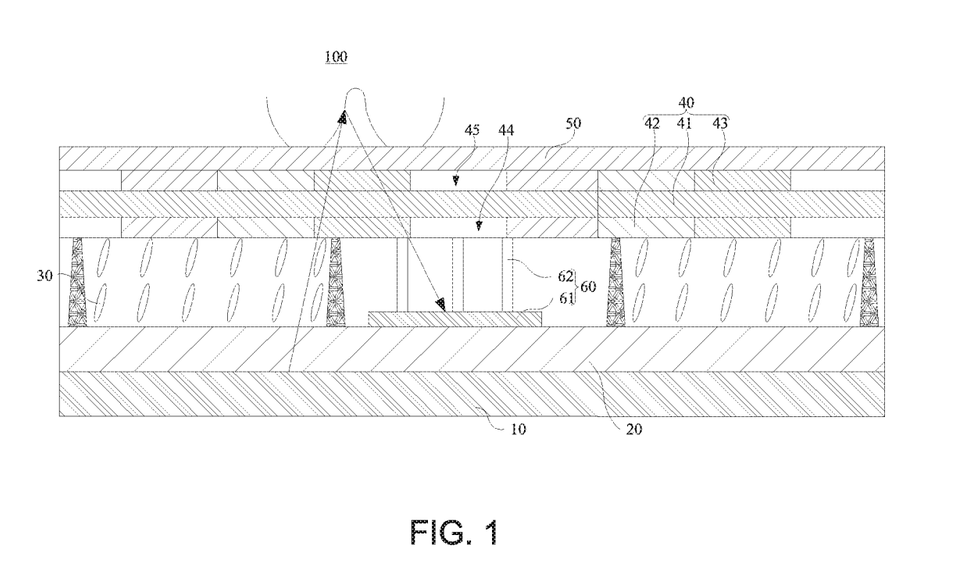
FIG. 1 is a schematic cross-sectional view of an embodiment of a display panel provided by the present invention.

Please refer to FIG. 1. FIG. 1 is a schematic cross-sectional view of an embodiment of the display panel 100 provided by the present invention.

The display panel 100 of the present invention comprises a backlight module 10, an array substrate 20, a liquid crystal layer 30, a color filter plate 40, a touch substrate 50, and a fingerprint recognition unit 60.

The backlight module 10, the array substrate 20, the liquid crystal layer 30, the color filter plate 40, and the touch substrate 50 are sequentially stacked. The backlight module 10 is used to emit light into the liquid crystal layer 30. The array substrate 20 is used to control a deflection angle of the liquid crystal layer 30 so that the light in the liquid crystal layer 30 is irradiated onto the color filter plate 40. The touch substrate 50 is used to receive finger touch. The light passing through the color filter plate 40 is irradiated onto the finger and reflected to the fingerprint recognition unit 60 disposed on a side of the color filter plate 40 away from the touch substrate 50.

Specifically, the backlight module 10 is used to emit white light. The array substrate 20 is disposed on a light-exiting side of the backlight module 10. The liquid crystal layer 30 is disposed on a side of the array substrate 20 away from the backlight module 10. The color filter plate 40 is disposed on a side of the liquid crystal layer 30 away from the array substrate 20. The touch substrate 50 is disposed on a side of the color filter plate 40 away from the liquid crystal layer 30. The fingerprint recognition unit 60 is disposed on a side of the color filter plate 40 away from the touch substrate 50. The fingerprint recognition unit 60 comprises a photodiode 61 and a plurality of shading bars 62. The photodiode 61 is disposed on a side of the color filter plate 40 away from the touch substrate 50. The photodiode 61 may be disposed on a side of the array substrate 20 as shown in FIG. 1. Of course, the photodiode 61 can also be disposed on a side of the color filter plate 40. The plurality of shading bars 62 are disposed on a side of a photosensitive surface of the photodiode 61. An orthographic projection of the plurality of shading bars 62 on the array substrate 20 is within an orthographic projection of the photodiode 61 on the array substrate 20.

In the embodiment, the backlight module 10 is used to emit the white light to obtain pure color light after passing through the color filter plate 40 to illuminate the finger touched on the touch substrate 50. The pure light can be red light, green light or blue light. In the following embodiments, it will take the blue light as an example to explain. But understandably, when the pure color light is the red light or green light, a working principle and effect of the embodiment are the same.

The blue light irradiates the finger and is reflected by the finger, and the blue light reflected by the finger passes through the color filter plate 40. Red and green layers in the color filter plate 40 filter the reflected blue light, thereby filtering out noise light with small angle. A blue layer in the color filter plate 40 will allow the reflected blue light to irradiate on the photosensitive surface of the photodiode 61. When the reflected blue light irradiates the photodiode 61, noise light with large angle is blocked by the shading bars 62. Therefore, the color filter plate 40 and the shading bars 62 cooperate with each other to shield both the noise light with small angle and the noise light with large angle, avoiding crosstalk phenomenon of adjacent fingerprint recognition units 60, and improving accuracy of fingerprint recognition.

In addition, the number of shading bars 62 is multiple. Each shading bar 62 only needs to cover a small part of a region, thereby reducing a height of the shading bar 62 to reduce an overall thickness of the display panel 100. The following will be explained with the red layer, the green layer, and the blue layer that are adjacent in order and have a width of 60 microns, but do not limit a scope of protection to be applied in the present invention.

Specifically, when the number of the shading bars 62 is two and they are disposed at opposite ends of the photodiode 61, a prerequisite for the shading bars 62 to block the noise light with large angle is that the height of the shading bars 62 is 50 microns.

When the number of the shading bars 62 is eight and they are evenly disposed on the photodiode 61 in sequence, the prerequisite for the shading bars 62 to block the noise light with large angle is that the height of the shading bars 62 is 6.25 microns. Understandably, the smaller the height of the shading bar 62, the higher the feasibility of setting the shading bar 62.

A material of the shading bar 62 can be polyimide or black acrylic.

It should be noted that the number of shading bars 62 cannot be increased without limit. Although as the number of shading bars 62 increases, the height of the shading bars 62 will decrease accordingly, thereby increasing the feasibility of setting the shading bars 62. However, when the number of shading bars 62 exceeds the limit, an effective aperture ratio of the photodiode 61 will decrease, thereby affecting a collection of effective signals.

The color filter plate 40 comprises a color substrate 41, a first color layer 42, and a second color layer 43, and the first color layer 42 and the second color layer 43 are disposed on opposite sides of the color substrate 41. The liquid crystal layer 30 is disposed on a side of the first color layer 42 away from the color substrate 41, and the touch substrate 50 is disposed on a side of the second color layer 43 away from the color substrate 41. It should be noted that a red layer, a green layer, and a blue layer in the first color layer 42 and a red layer, a green layer, and a blue layer in the second color layer 43 correspond to each other. The first color layer 42 and the second color layer 43 cooperate with each other to further filter out more noise light, so as to further reduce the height of the light shielding bar 62 and reduce the number of an arrangement of the light shielding bar 62.

The first color layer 42 is provided with a first transparent region 44, the second color layer 43 is provided with a second transparent region 45 directly opposite the first transparent region 44, and the photosensitive surface of the photodiode 61 is directly opposite the first transparent region 44. The light reflected by the finger can be directly incident on the photodiode 61 through the first transparent region 44 and the second transparent region 45 to increase photosensitive intensity of the photodiode 61. It is worth explaining that both the first transparent region 44 and the second transparent region 45 are regions without red, green and blue resistances, which are generally filled with transparent materials.

Figure 2:
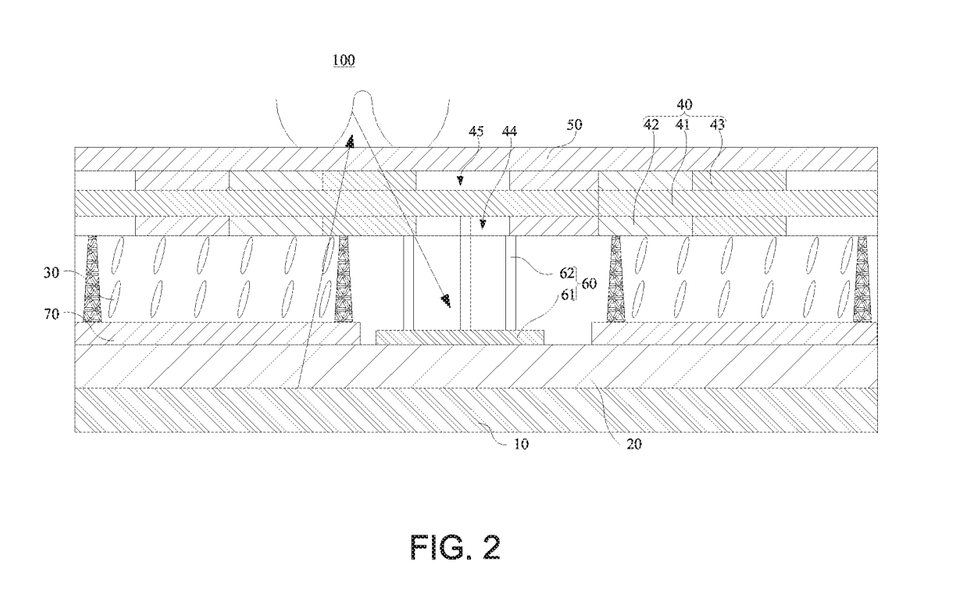
FIG. 2 is a schematic cross-sectional view of another embodiment of the display panel provided by the present invention.

Please refer to FIG. 2. FIG. 2 is a schematic cross-sectional view of another embodiment of the display panel 100 provided by the present invention.

In another embodiment, the display panel 100 further comprises a transparent spacer layer 70. The transparent spacer layer 70 is disposed between the array substrate 20 and the liquid crystal layer 30, and the fingerprint recognition unit 60 is disposed between the color filter plate 40 and the array substrate 20. A thickness of the liquid crystal layer 30 is less than a thickness of the fingerprint recognition unit 60. Specifically, the thickness of the fingerprint recognition unit 60 is approximately equal to a sum of the thickness of the liquid crystal layer 30 and a thickness of the transparent spacer layer 70. A distance between the array substrate 20 and the color filter plate 40 can be adjusted according to the thickness of the transparent spacer layer 70, so that the height of the light shielding bar 62 is appropriate. Therefore, the fingerprint recognition unit 60 just receives the reflected light of the fingerprint of the corresponding region without being crosstalked by the reflected light of other regions.

The thickness of the liquid crystal layer 30 may be 2 microns to 5 microns. If the thickness of the liquid crystal layer 30 continues to increase, a response time will increase significantly. The thickness of the fingerprint recognition unit 60 may be 5 microns to 10 microns.

For example, if the thickness of the liquid crystal layer 30 is set to 3 microns and the thickness of the transparent spacer layer 70 is set to 3 microns, the thickness of the fingerprint recognition unit 60 is 6 microns. Generally, the thickness of the liquid crystal layer 30 increases, and the response time of the display panel 100 also increases accordingly. However, the increase in the number of shading bars 62 will reduce the aperture ratio of the display panel 100. The transparent spacer layer 70 is provided between the array substrate 20 and the liquid crystal layer 30, and the distance between the array substrate 20 and the color filter 40 can be adjusted according to the thickness of the transparent spacer layer 70. The height of the shading bars 62 is appropriate without affecting the thickness of the liquid crystal layer 30, so that the fingerprint recognition unit 60 receives the reflected light of the fingerprint in the corresponding region without crosstalk of reflected light from other regions.

The specific implementation method is as follows: 1. disposing the photodiode 61 on the array substrate 20; 2. coating a layer of transparent insulating material to form the transparent spacer layer 70; 3. forming the liquid crystal layer 30; 4. etching away the transparent spacer layer 70 at the photodiode 61, coating shading material, and then etching to form the plurality of shading bars 62.

In the embodiment, the fingerprint recognition unit 60 and the liquid crystal layer 30 are separately disposed, and do not affect each other. The height of the shading bars 62 can be adjusted freely according to the fingerprint recognition accuracy without affecting the thickness of the liquid crystal layer 30 to ensure a normal display of the display panel 100.

Optionally, the photodiode 61 and the transparent spacer layer 70 may be disposed in a same layer.

Optionally, the plurality of shading bars 62 hold the color filter plate 40 to support the color filter plate 40, thereby improving overall stability of the display panel 100.

Figure 3:
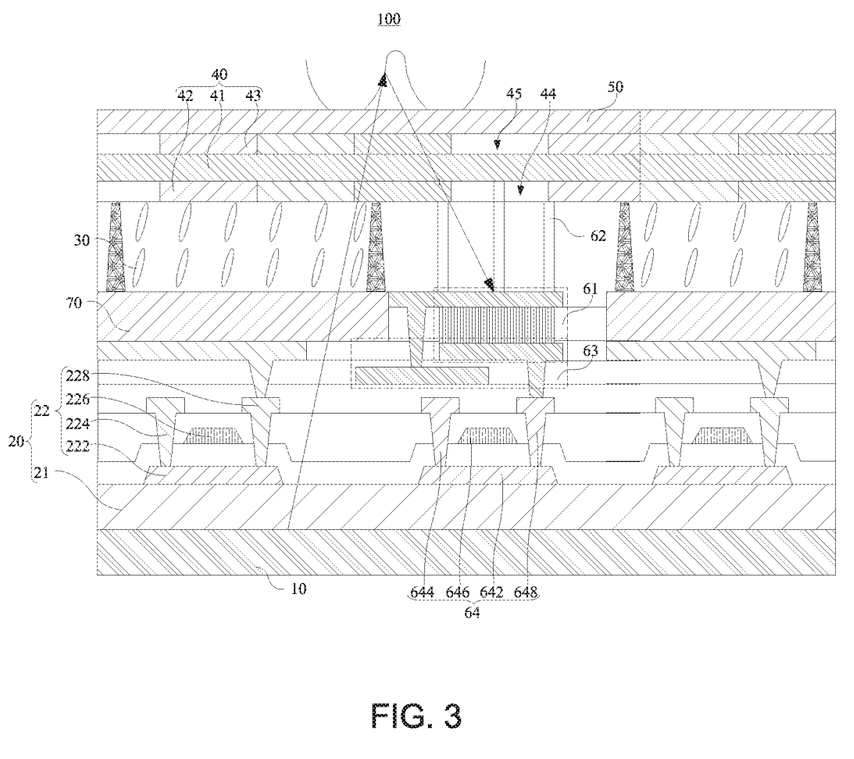
FIG. 3 is a schematic cross-sectional view of another embodiment of the display panel provided by the present invention.
Figure 4:
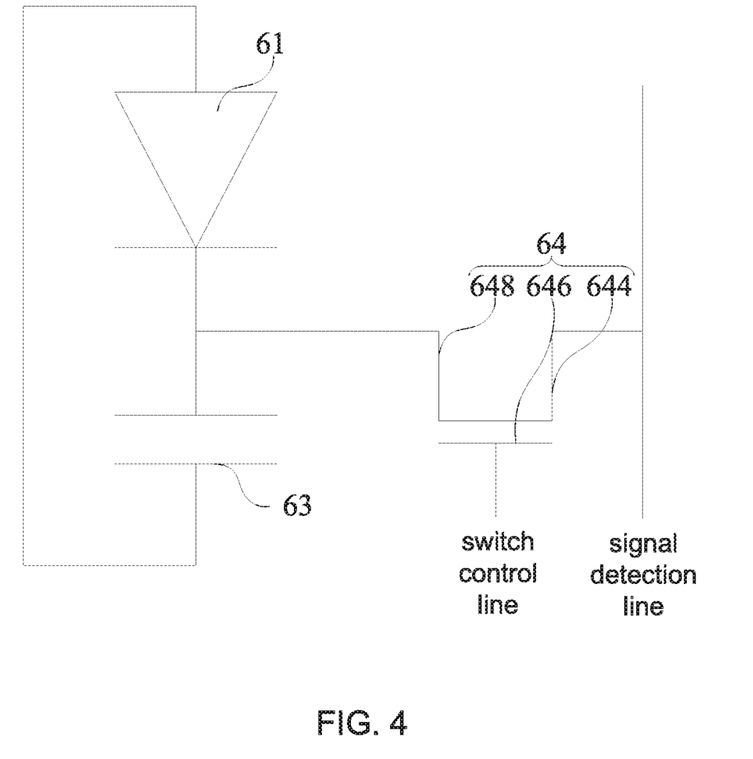
FIG. 4 is a schematic view of a circuit structure of a fingerprint recognition unit provided by the present invention.

Please refer to FIG. 3 and FIG. 4. FIG. 3 is a schematic cross-sectional view of another embodiment of the display panel 100 provided by the present invention. FIG. 4 is a schematic view of a circuit structure of the fingerprint recognition unit 60 provided by the present invention.

Specifically, the array substrate 20 comprises a base substrate 21 and a display drive circuit 22 on a side of the base substrate 21 close to the color filter plate 40. The fingerprint recognition unit 60 further comprises a storage capacitor 63 and a driving thin film transistor 64 that are electrically connected to the photodiode 61. The display driving circuit 22 and the driving thin film transistor 64 are disposed in a same layer, so that the driving thin film transistor 64 is manufactured at the same time as the display driving circuit 22 is manufactured, so as to simplify a manufacturing process of the display panel 100.

The display driving circuit 22 comprises a first active layer 222, a first source 224, a first gate 226, and a first drain 228. The driving thin film transistor 64 comprises a second active layer 642, a second source 644, a second gate 646, and a second drain 648. The display driving circuit 22 and the driving thin film transistor 64 are disposed in a same layer. Specifically, the first active layer 222 and the second active layer 642 are disposed in a same layer, the first source 224 and the second source 644 are disposed in a same layer, the first gate 226 and the second gate 646 are disposed in a same layer, and the first drain 228 and the second drain 648 are disposed in a same layer.

An anode of the photodiode 61 is electrically connected to a first electrode of the storage capacitor 63, and a cathode of the photodiode 61 is electrically connected to a second electrode of the storage capacitor 63 and the second drain 648 of the driving thin film transistor 64. The second gate 646 of the driving thin film transistor 64 is electrically connected to a switch control line, and the second source electrode 644 of the driving thin film transistor 64 is electrically connected to a signal detection line. The photodiode 61 is used to convert the fingerprint signal light reflected by the finger into a current signal. In a fingerprint recognition stage, the driving thin film transistor 64 is turned on, and the current signal is transmitted to the signal detection line through the driving thin film transistor 64 to perform fingerprint recognition according to the current signal.

Of course, in another embodiment, the transparent spacer layer 70 may also be disposed between the color filter plate 40 and the liquid crystal layer 30.

Figure 5:
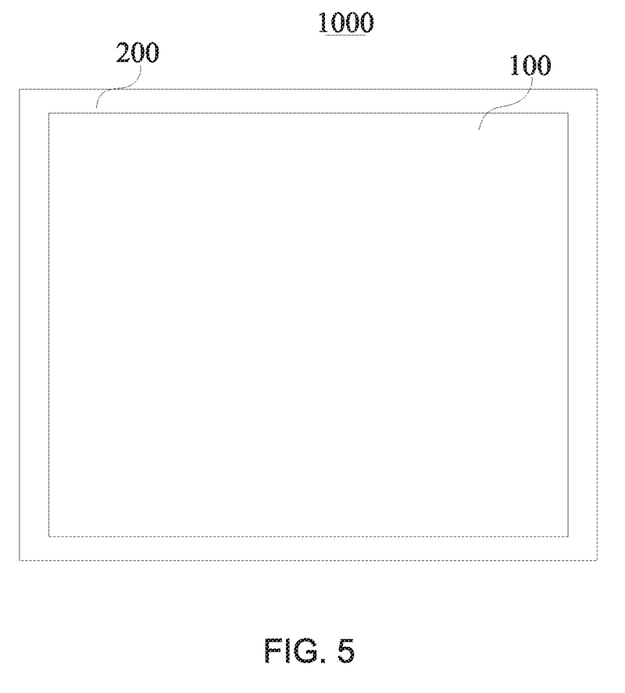
FIG. 5 is a schematic structural view of an embodiment of an electronic device provided by the present invention.

Please refer to FIG. 5. FIG. 5 is a schematic structural view of an embodiment of an electronic device 1000 provided by the present invention.

The electronic device 1000 may comprises a housing 200 and the display panel 100 described in any embodiment of the present invention, and the display panel 100 is disposed on the housing 200. The electronic device 1000 may be a mobile phone, and the electronic device 1000 may also be a computer, television, and smart wearable device, etc.

The above are only the embodiments of the present invention, and therefore do not limit a patent scope of the present invention. Any equivalent structure or equivalent process transformation made by the description and drawings of the present invention, or directly or indirectly used in other related technical fields, are also within the scope of patent protection of the present invention.

What is claimed is:

1. A display panel, comprising:
   a backlight module;
   an array substrate disposed on a light-exiting side of the backlight module;
   a liquid crystal layer disposed on a side of the array substrate away from the backlight module;
   a color filter plate disposed on a side of the liquid crystal layer away from the array substrate;
   a touch substrate disposed on a side of the color filter plate away from the liquid crystal layer;
   a fingerprint recognition unit disposed on a side of the color filter plate away from the touch substrate, wherein the fingerprint recognition unit comprises a photodiode and a plurality of shading bars, the photodiode is disposed on a side of the color filter plate away from the touch substrate, the plurality of shading bars are disposed on a side of a photosensitive surface of the photodiode, and an orthographic projection of the plurality of shading bars on the array substrate is within an orthographic projection of the photodiode on the array substrate; and
   a transparent spacer layer disposed between the array substrate and the liquid crystal layer,
   wherein the backlight module is used to emit white light to irradiate a finger touching the touch substrate, the plurality of shading bars is used to block light partially reflected from the finger to the photodiode, and the fingerprint recognition unit is disposed between the color filter plate and the array substrate.

2. The display panel as claimed in claim 1, wherein the color filter plate comprises a color substrate, a first color layer, and a second color layer, the first color layer and the second color layer are disposed on opposite sides of the color substrate, the liquid crystal layer is disposed on a side of the first color layer away from the color substrate, and the touch substrate is disposed on a side of the second color layer away from the color substrate.

3. The display panel as claimed in claim 2, wherein the first color layer is provided with a first transparent region, the second color layer is provided with a second transparent region directly opposite the first transparent region, and the photosensitive surface of the photodiode is directly opposite the first transparent region.

4. The display panel as claimed in claim 1, wherein the array substrate comprises a base substrate and a display driving circuit, and the display driving circuit is on a side of the base substrate close to the color filter plate; and wherein the fingerprint recognition unit further comprises a storage capacitor and a driving thin film transistor that are electrically connected to the photodiode, and the display driving circuit and the driving thin film transistor are disposed in a same layer.

5. The display panel as claimed in claim 4, wherein the display driving circuit comprises a first active layer, a first source, a first gate, and a first drain, the driving thin film transistor comprises a second active layer, a second source, a second gate, and a second drain, the first active layer and the second active layer are disposed in a same layer, the first source and the second source are disposed in a same layer, the first gate and the second gate are disposed in a same layer, and the first drain and the second drain are disposed in a same layer.

6. The display panel as claimed in claim 4, wherein the photodiode and the transparent spacer layer are disposed in a same layer.

7. The display panel as claimed in claim 1, wherein the plurality of shading bars hold the color filter plate.

8. An electronic device, comprising:
   a housing and a display panel, and the display panel is disposed on the housing;
   wherein the display panel comprises:
   a backlight module;
   an array substrate disposed on a light-exiting side of the backlight module;
   a liquid crystal layer disposed on a side of the array substrate away from the backlight module;
   a color filter plate disposed on a side of the liquid crystal layer away from the array substrate;
   a touch substrate disposed on a side of the color filter plate away from the liquid crystal layer;
   a fingerprint recognition unit disposed on a side of the color filter plate away from the touch substrate, wherein the fingerprint recognition unit comprises a photodiode and a plurality of shading bars, the photodiode is disposed on a side of the color filter plate away from the touch substrate, the plurality of shading bars are disposed on a side of a photosensitive surface of the photodiode, and an orthographic projection of the plurality of shading bars on the array substrate is within an orthographic projection of the photodiode on the array substrate; and
   a transparent spacer layer disposed between the array substrate and the liquid crystal layer, wherein the backlight module is used to emit white light to irradiate a finger touching the touch substrate, the plurality of shading bars is used to block light partially reflected from the finger to the photodiode, and the fingerprint recognition unit is disposed between the color filter plate and the array substrate.

9. The electronic device as claimed in claim 8, wherein the color filter plate comprises a color substrate, a first color layer, and a second color layer, the first color layer and the second color layer are disposed on opposite sides of the color substrate, the liquid crystal layer is disposed on a side of the first color layer away from the color substrate, and the touch substrate is disposed on a side of the second color layer away from the color substrate.

10. The electronic device as claimed in claim 9, wherein the first color layer is provided with a first transparent region, the second color layer is provided with a second transparent region directly opposite the first transparent region, and the photosensitive surface of the photodiode is directly opposite the first transparent region.

11. The electronic device as claimed in claim 8, wherein the array substrate comprises a base substrate and a display driving circuit, and the display driving circuit is on a side of the base substrate close to the color filter plate; and wherein the fingerprint recognition unit further comprises a storage capacitor and a driving thin film transistor that are electrically connected to the photodiode, and the display driving circuit and the driving thin film transistor are disposed in a same layer.

12. The electronic device as claimed in claim 11, wherein the display driving circuit comprises a first active layer, a first source, a first gate, and a first drain, the driving thin film transistor comprises a second active layer, a second source, a second gate, and a second drain, the first active layer and the second active layer are disposed in a same layer, the first source and the second source are disposed in a same layer, the first gate and the second gate are disposed in a same layer, and the first drain and the second drain are disposed in a same layer.

13. The electronic device as claimed in claim 11, wherein the photodiode and the transparent spacer layer are disposed in a same layer.

14. The electronic device as claimed in claim 8, wherein the plurality of shading bars hold the color filter plate.

15. A display panel, comprising:
a backlight module;
an array substrate disposed on a light-exiting side of the backlight module;
a liquid crystal layer disposed on a side of the array substrate away from the backlight module;
a color filter plate disposed on a side of the liquid crystal layer away from the array substrate;
a touch substrate disposed on a side of the color filter plate away from the liquid crystal layer;
a fingerprint recognition unit disposed on a side of the color filter plate away from the touch substrate, wherein the fingerprint recognition unit comprises a photodiode and a plurality of shading bars, the photodiode is disposed on a side of the color filter plate away from the touch substrate, the plurality of shading bars are disposed on a side of a photosensitive surface of the photodiode, and an orthographic projection of the plurality of shading bars on the array substrate is within an orthographic projection of the photodiode on the array substrate; and
a transparent spacer layer disposed between the color filter plate and the liquid crystal layer,
wherein the backlight module is used to emit white light to irradiate a finger touching the touch substrate, the plurality of shading bars is used to block light partially reflected from the finger to the photodiode, and the fingerprint recognition unit is disposed between the color filter plate and the array substrate.

16. The display panel as claimed in claim 15, wherein the color filter plate comprises a color substrate, a first color layer, and a second color layer, the first color layer and the second color layer are disposed on opposite sides of the color substrate, the liquid crystal layer is disposed on a side of the first color layer away from the color substrate, and the touch substrate is disposed on a side of the second color layer away from the color substrate.

17. The display panel as claimed in claim 16, wherein the first color layer is provided with a first transparent region, the second color layer is provided with a second transparent region directly opposite the first transparent region, and the photosensitive surface of the photodiode is directly opposite the first transparent region.

\* \* \* \* \*